United States Patent [19]

Mangano

[11] 4,287,216
[45] Sep. 1, 1981

[54] CHOCOLATE CONFECTION CONTAINING CARBONATED HARD CANDY CRYSTALS DISPERSED THEREIN

[75] Inventor: Santi F. Mangano, Perugia, Italy

[73] Assignee: I.B.P. Industrie Buitoni Perugina S.p.A., Perugia, Italy

[21] Appl. No.: 108,703

[22] Filed: Dec. 31, 1979

[30] Foreign Application Priority Data

Nov. 16, 1979 [IT] Italy .................................. 50844 A/79

[51] Int. Cl.$^3$ ................................................ A23G 9/00
[52] U.S. Cl. ......................................... 426/93; 426/96; 426/103; 426/660
[58] Field of Search ....................... 426/5, 660, 93, 96, 426/103

[56] References Cited

U.S. PATENT DOCUMENTS

| | | | |
|---|---|---|---|
| 3,012,893 | 12/1961 | Kremzner | 426/660 |
| 3,985,909 | 10/1976 | Kirkpatrick | 426/670 |
| 3,985,910 | 10/1976 | Kirkpatrick | 426/660 |
| 4,001,457 | 1/1977 | Hegadorn | 426/660 |
| 4,045,583 | 8/1977 | Jeffery et al. | 426/660 |
| 4,150,161 | 4/1979 | Rudolph | 426/5 |

*Primary Examiner*—Jeanette M. Hunter
*Attorney, Agent, or Firm*—Cushman, Darby & Cushman

[57] ABSTRACT

A confectionery product comprising at least two components, the first component being chocolate, and the second component being a certain amount of candied popping crystals, said two components having both a moisture content between about 0.1 and 5.0%; the product is manufactured substantially with moisture proof material.

7 Claims, No Drawings

CHOCOLATE CONFECTION CONTAINING CARBONATED HARD CANDY CRYSTALS DISPERSED THEREIN

This invention concerns a confectionery product which comprises at least two components, the first component being chocolate, a surrogate thereof or the like, and the second component being a certain amount of candied popping crystals; such a product may be in the form of chocolate, a surrogate thereof or the like, containing said crystals scattered in its mass.

Chocolate is a known confectionery product manufactured with the following raw materials: sugar, cocoa, cocoa butter, milk, nuts and aromas; the term surrogate here is to be intended as describing a confectionery product having a structure, consistency, color and taste, all of which recall those of chocolate; the term "and the like" is to be intended here as describing confectionery products not containing cocoa and having a structure and consistency which recall those of surrogate and chocolate.

Chocolate or surrogate or like confectionery products are all suitable for use in manufacturing this new confectionery product, although they must nevertheless be obtained, as will be explained further on, through an accurate technological process. In the following description, the component known as chocolate, surrogate or like confectionery product will be referred to simply as "chocolate or the like".

The above mentioned popping candied crystals consist, as it is known through U.S. Pat. No. 3,012,893 and as will be explained more in detail further on, of sugar crystals and by-products thereof, incorporating gas under pressure, such as carbon dioxide, hydrogen, air or inert gas such as helium. The combination brought about in the confectionery product of this invention, of the two components of chocolate or the like and popping candied crystals, when eaten, offers a new, very special and pleasant effect as the chocolate flavor and the sensation of the popping crystals blend together in a high, mutually exalted way as the product melts in the mouth.

It is very important for the amount of moisture of the chocolate or like to be small since if it is too high in value it would cause problems with respect to conservation of the final product; in fact, the moisture contained in the mass of the chocolate or the like tends to transfer to the popping candied crystals, which could therefore swell, reducing the pressure of said incorporated gas thus reducing or eliminating the particular popping effect. For this reason, the chocolate or the like to be employed in this confectionery product must have a moisture content between about 0.1 and about 5.0% and preferably below 1%.

In order to produce a chocolate or the like having a low moisture content it is necessary to employ raw materials which are as anhydrous as possible and to perform a very accurate processing cycle. It is important to carry out the mixing phase of the raw materials in a vacuum processing apparatus heated at a temperature of 40°–80° C.; such treatment has a duration of about 60–80 minutes in order to allow the most thorough elimination of moisture as possible.

It is also important to carry out the phase of beating the melted and refined mass of the chocolate or the like through the dry system, i.e. without adding fats, whereby moisture, not bound to fats, will be subjected to easier evaporation, consequently further reducing the moisture content of the final product.

The popping candied crystals are manufactured through a process under pressure at the melting temperature of sugar, which is generally between the values of 100° and 160° C., and introducing gas such as carbon dioxide at a pressure between about 1 and 80 atmospheres. The melted and gasified mass is next subjected to cooling under pressure up to the point of solidification of the sugar. The solid mass, now in the form of large crystals, is crumbled and sieved to the desired particle size. Sugar and derivatives thereof, employed in the production of popping candied crystals are, as an example, saccharose, lactose, maltose, fructose, glucose (solidification and melting points between 25° and 200° C.); saccharose combined with glucose and lactose yields best results since a product is obtained which is hard, of low hygroscopicity and stickiness, capable of producing a good popping effect and which can stand conservation temperatures up to 35° C.

Popping candied crystals have a moisture content between about 0.1 and about 5% preferably equal to 3%; values which are over those just indicated may create a product the popping capability of which is quite low.

The quantity of gas, such as carbon dioxide, contained under pressure in the popping candied crystals, at the end of the gassification process, is between about 0.1 and about 1% in weight and its optimum value is 0.4%. The specific weight of the popping candied crystals is about 730–750 g/liter; sifting is preferably done through meshes having apertures of no less than 0.5 mm and no larger than 4 mm.

Chocolate or the like, if maintained above its melting point is in a liquid state, and generally the melting temperature is within the range of 25°–37° C. Under such conditions it is possible to perform mixing of the chocolate, or the like, with the popping candied crystals, said mixing operation taking place in a machine heated at a temperature of about 35° C. and equipped with a stirring device to ensure an effective mixing of the two components.

The machine which performs this operation is placed in an ambient where relative humidity has a value between about 25 and 30% while temperature has a maximum value of about 30° C. This is necessary in order to avoid that the ambient humidity is absorbed by the popping candied crystals, particularly hygroscopic, thus reducing their popping power.

The mixing ratio, with regard to weight, between chocolate or the like and popping candied crystals is between 10:1 and 1:10, but it is preferably kept between 9:1 and 8:2, the ratio depending on the particular pouring machine (of which more details will follow) and on the characteristics of the final product which is desired.

After the mixing of the chocolate or the like, with the popping candied crystals, the mass at a temperature of 30°–35° C. is sent to a pouring machine capable of either pouring it in moulds or extruding it over a belt.

The melted mass therefore takes the shape of said moulds or settles on said belt where it takes a more or less irregular shape. Choice of either one pouring system or the other depends on the desired shape of the final product.

The percentage of fat substances (such as cocoa butter for the chocolate, and hydrogenated fats for the surrogate) to be used in the preparation of the chocolate or the like, also depends on the type of pouring system employed; in fact, a mass to be poured in a mould must contain a percentage of fat substance superior to that which must be contained in a mass to be extruded over a belt.

It should be noted also that the pouring or extruding phase must be carried out in a controlled humidity ambient (humidity being between 25 and 30%).

The mass is then subjected to cooling in order to allow solidification both of the fat it contains and stiffening of the structure of the mass itself.

It will be obvious that as a variation to the above described pouring phase, it is possible to provide for a controlled quantity of popping candied crystals in the moulds and then pour the proper mass of chocolate or the like over said moulds.

The finished product may have the shape of small round or square pieces, or of bars or slabs of different dimensions. It is however important to package the finished product in some form of wrapping material or the like which will allow a long conservation, i.e. materials which are substantially humidity proof; for the same purpose, said wrapping material should preferably be heat sealed.

The popping candied crystals and the chocolate or the like may be enriched with particular aromas in order to give the finished product an aromatic characteristic.

Other possibilities consist in combining the said two components with a third component such as a cream filling or the like, in which case said crystals are scattered in said filling, or combining chocolate or the like and the crystals with one or more additional components such as nut shavings, small pieces of blown dough or the like in which case a product is obtained which comprises chocolate or the like, containing, scattered in its mass, said crystals and said additional components.

It will be obvious that other variations and modifications may be applied by the expert to the above illustrated form of implementation of this invention, without departing from the spirit thereof; it is understood that such variations and modifications are all well within the scope of the invention itself.

What is claimed is:

1. A confectionery product, which comprises at least two components, the first component being chocolate, and the second component being a certain number of popping candied crystals, said chocolate and said popping candied crystals having a moisture content between about 0.1 and about 5.0%, said crystals being sugar crystals such as saccharose, glucose, lactose, maltose, and fructose, and containing a gas such as carbon dioxide, hydrogen, air or inert gas, at a pressure of about 1 to about 80 atmospheres and in a quantity between about 0.1 and about 1% in weight, the ratio between the first and second component being between 10:1 and 1:10 by weight.

2. The confectionery product of claim 1 wherein said chocolate component has a moisture content below 1%.

3. The confectionery product of claim 1, wherein said popping candied crystals have a moisture content of 3%.

4. The confectionery product of claim 1, wherein the quantity of gas contained in said popping candied crystals is 0.4%.

5. The confectionery product of claim 1 wherein said ratio is between 9:1 and 8:2.

6. The confectionery product of claim 1 in the form of chocolate containing, scattered in its mass, said popping candied crystals and said product being in the form of pieces of any form and dimension.

7. The confectionery product of claim 1 wherein the popping candy crystals have a specific weight of 730–750 gram/liter.

* * * * *

REEXAMINATION CERTIFICATE (128th)

United States Patent [19]

Mangano

[11] B1 4,287,216

[45] Certificate Issued Oct. 11, 1983

[54] CHOCOLATE CONFECTION CONTAINING CARBONATED HARD CANDY CRYSTALS DISPERSED THEREIN

[75] Inventor: Santi F. Mangano, Perugia, Italy

[73] Assignee: I.B.P. Industrie Buitoni Perugina S.p.A., Perugia, Italy

Reexamination Request:
No. 90/000,183, Apr. 1, 1982

Reexamination Certificate for:
Patent No.: 4,287,216
Issued: Sep. 1, 1981
Appl. No.: 108,703
Filed: Dec. 31, 1979

[30] Foreign Application Priority Data

Nov. 16, 1979 [IT] Italy .............................. 50844 A/79

[51] Int. Cl.³ .............................................. A23G 3/00
[52] U.S. Cl. ...................................... 426/96; 426/103; 426/613; 426/660
[58] Field of Search .............. 426/660, 564, 658, 474, 426/477, 103

[56] References Cited

U.S. PATENT DOCUMENTS

| | | | |
|---|---|---|---|
| 3,012,893 | 12/1961 | Kremzner | 426/660 |
| 3,985,909 | 10/1976 | Kirkpatrick | 426/660 |
| 3,985,910 | 10/1976 | Kirkpatrick | 426/660 |
| 4,001,457 | 1/1977 | Hegadorn | 426/660 |
| 4,045,583 | 8/1977 | Jeffery | 426/660 |
| 4,150,161 | 4/1979 | Rudolph | 426/660 |
| 4,275,083 | 6/1981 | Colten et al. | 426/96 |

*Primary Examiner*—Jeanette M. Hunter

[57] ABSTRACT

A confectionery product comprising at least two components, the first component being chocolate, and the second component being a certain amount of candied popping crystals, said two components having both a moisture content between about 0.1 and 5.0%; the product is manufactured substantially with moisture proof material.

REEXAMINATION CERTIFICATE ISSUED UNDER 35 U.S.C. 307.

CHOCOLATE CONFECTION CONTAINING CARBONATED HARD CANDY CRYSTALS DISPERSED THEREIN

THE PATENT IS HEREBY AMENDED AS INDICATED BELOW.

AS A RESULT OF REEXAMINATION IT HAS BEEN DETERMINED THAT:

Claims 1-7 having been finally determined to be unpatentable, are cancelled.